(12) United States Patent
Stefani et al.

(10) Patent No.: US 10,053,287 B2
(45) Date of Patent: Aug. 21, 2018

(54) RETRIEVAL/STORAGE APPARATUS FOR AUTOMATIC WAREHOUSE SYSTEMS

(71) Applicant: MODULA S.P.A. CON SOCIO UNICO, Fiorano Modenese (Modena) (IT)

(72) Inventors: Franco Stefani, Sassuolo (IT); Stefano Cassani, Imola (IT)

(73) Assignee: MODULA S.P.A. CON SOCIO UNICO, Fiorano Modenese (IT)

( * ) Notice: Subject to any disclaimer, the term of this patent is extended or adjusted under 35 U.S.C. 154(b) by 70 days.

(21) Appl. No.: 14/917,506

(22) PCT Filed: Aug. 5, 2014

(86) PCT No.: PCT/IB2014/063715
§ 371 (c)(1),
(2) Date: Mar. 8, 2016

(87) PCT Pub. No.: WO2015/036879
PCT Pub. Date: Mar. 19, 2015

(65) Prior Publication Data
US 2016/0214796 A1 Jul. 28, 2016

(30) Foreign Application Priority Data
Sep. 13, 2013 (IT) .............................. MO2013A0252

(51) Int. Cl.
*B65G 1/06* (2006.01)
*A47B 51/00* (2006.01)
(Continued)

(52) U.S. Cl.
CPC ................ *B65G 1/06* (2013.01); *A47B 51/00* (2013.01); *B65G 1/10* (2013.01); *B65G 1/137* (2013.01); *E06B 9/15* (2013.01)

(58) Field of Classification Search
CPC .................................. B65G 1/06; B65G 1/137
See application file for complete search history.

(56) References Cited

U.S. PATENT DOCUMENTS 1,857,368 A * 5/1932 Flynn ..................... G03B 21/00
160/124
3,739,510 A * 6/1973 Ohison .................... B65G 1/06
40/381
(Continued)

FOREIGN PATENT DOCUMENTS

DE 102008027646 A1 12/2009
EP 1061013 A1 12/2000
(Continued)

*Primary Examiner* — James Keenan
(74) *Attorney, Agent, or Firm* — Pearne & Gordon LLP

(57) ABSTRACT

A retrieval/storage apparatus (2) for warehouses (1), including: a support frame (8) having a retrieval/storage surface (9) for at least one article which must be retrieved from a respective warehouse (1) or stored in the warehouse (1); the frame (8) defining a housing space (10) of a drawer (4) for containing one or more articles; and an access device (11) operatively active on the retrieval/storage surface (9) so as to open/close at least one opening (12) through which it is possible to access the housing space (10), inside the drawer (4); the access device (11) includes a first and a second wall (13, 14) both mobile along the retrieval/storage surface (9), and at least a third wall (15) mobile along the retrieval/storage level (9) in a direction transversal to the direction of movement of the first and second walls (13, 14).

28 Claims, 12 Drawing Sheets

(51) Int. Cl.
*E06B 9/15* (2006.01)
*B65G 1/137* (2006.01)
*B65G 1/10* (2006.01)

(56) References Cited

U.S. PATENT DOCUMENTS

| | | | | |
|---|---|---|---|---|
| 5,820,237 | A * | 10/1998 | Robey | B65G 1/127 |
| | | | | 312/139.2 |
| 6,450,598 | B1 | 9/2002 | Hanel | |
| 6,561,250 | B2 * | 5/2003 | Hutchins | G09F 11/025 |
| | | | | 160/122 |
| 6,848,491 | B2 * | 2/2005 | Gambarelli | B65G 1/02 |
| | | | | 160/122 |
| 6,994,409 | B2 * | 2/2006 | Godlewski | A47B 63/06 |
| | | | | 312/215 |
| 9,044,106 | B1 * | 6/2015 | Smith | B65G 1/06 |
| 9,045,923 | B2 * | 6/2015 | Krawczyk | E05B 47/02 |
| 2004/0031574 | A1 | 2/2004 | Gambarelli et al. | |

FOREIGN PATENT DOCUMENTS

| | | |
|---|---|---|
| EP | 1382273 A1 | 1/2004 |
| EP | 2508163 A1 | 10/2012 |
| JP | S58-178229 | 10/1983 |
| JP | S60-085508 U1 | 6/1985 |
| JP | 2004035267 A1 | 5/2004 |
| JP | 2012-092606 A | 5/2012 |

* cited by examiner

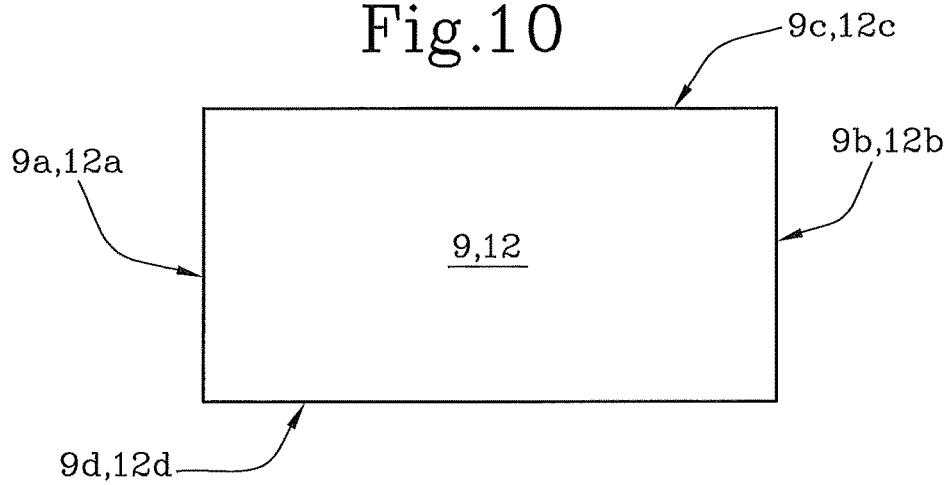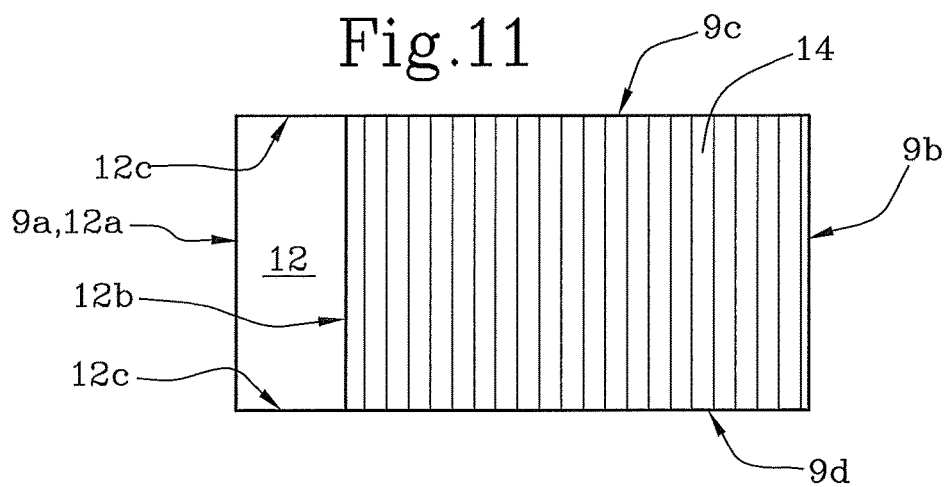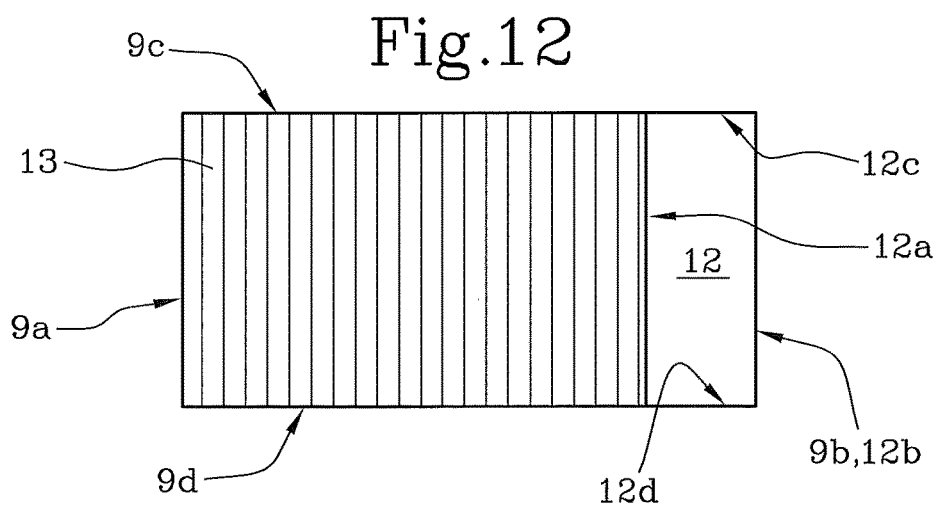

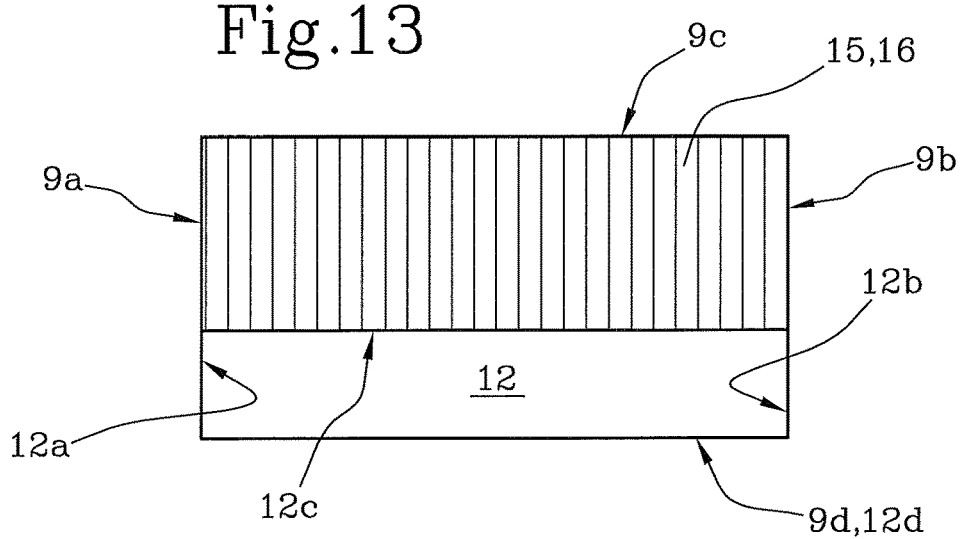
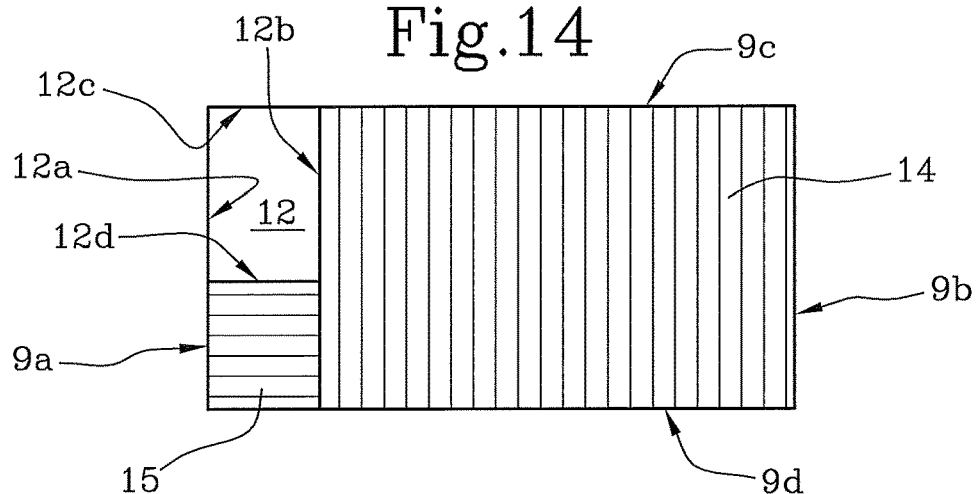
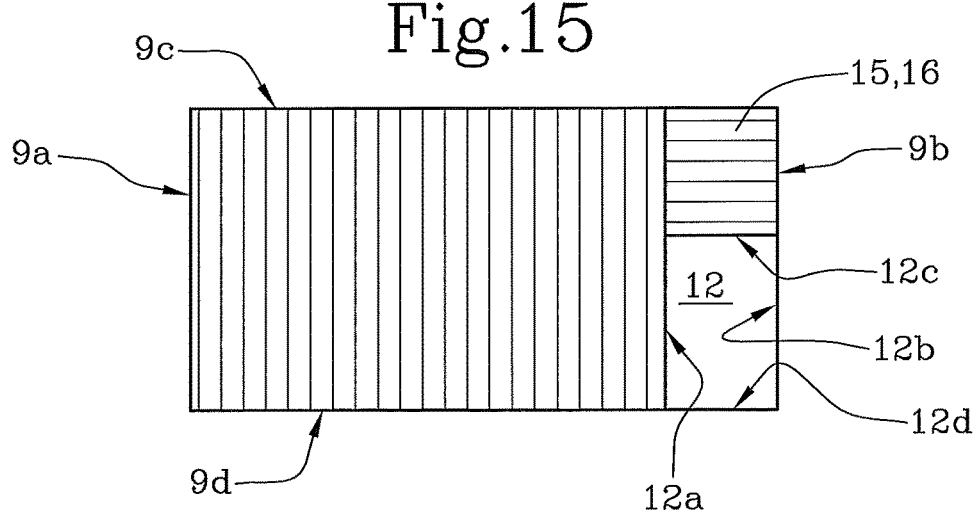

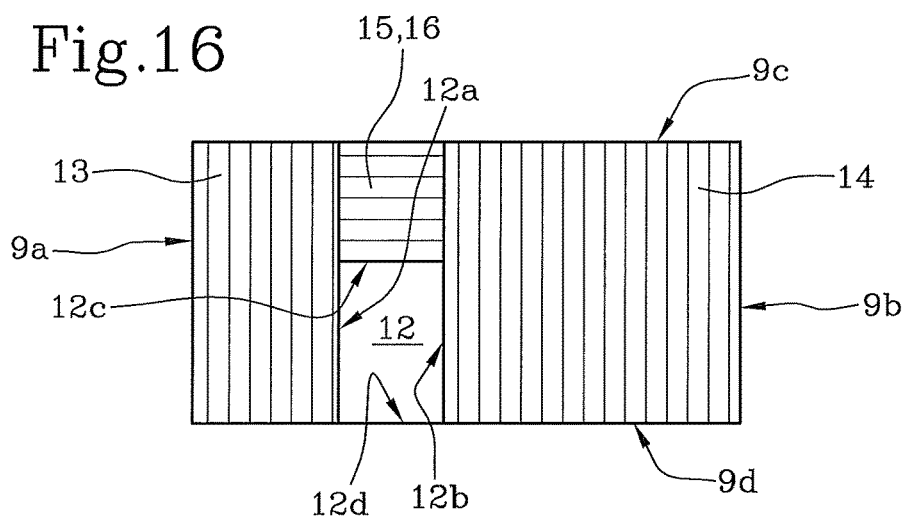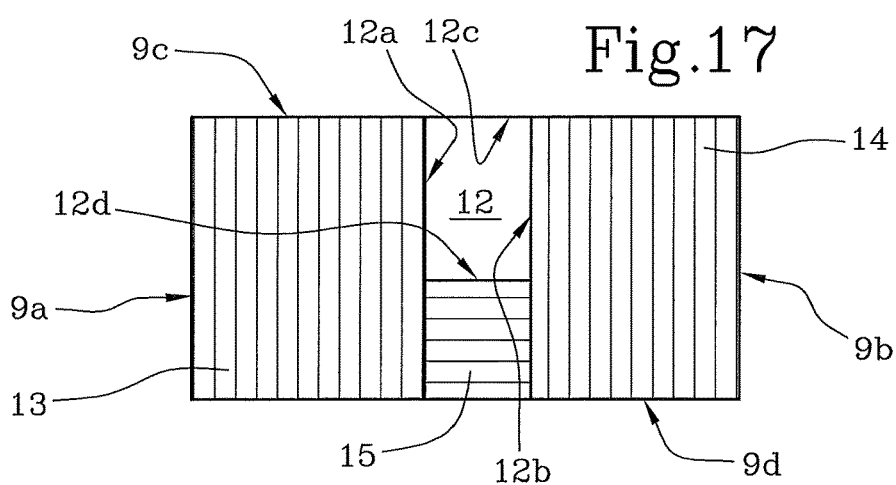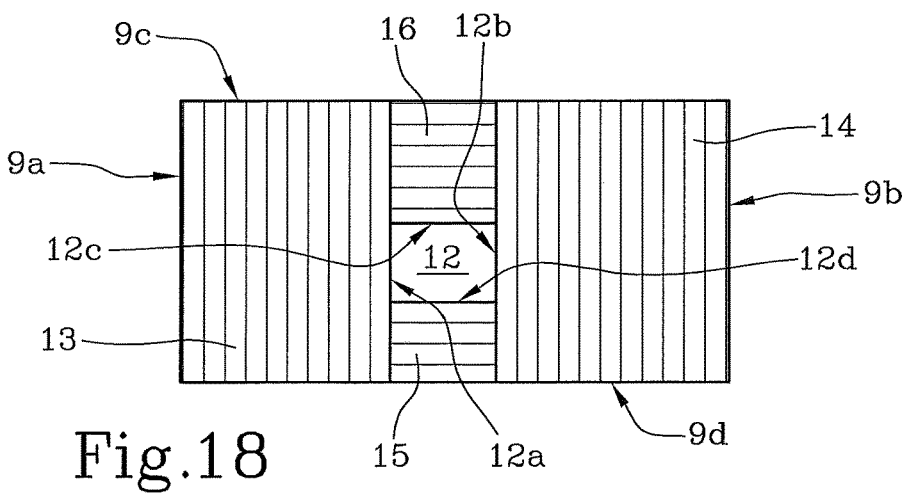

RETRIEVAL/STORAGE APPARATUS FOR AUTOMATIC WAREHOUSE SYSTEMS

FIELD OF THE INVENTION

The present invention relates to a retrieval/storage apparatus for automatic warehouses.

The present invention further relates to an automatic warehouse equipped with a respective apparatus that enables the retrieval and/or storage of various kinds of articles inside the automatic warehouse.

DESCRIPTION OF RELATED ART

The warehouse lends itself particularly well to managing drawers in the form of a substantially flat tray, which are arranged vertically one above the other in a respective shelf structure.

Each drawer is suitable for containing one or more articles, based on the size and type of the articles, which can for example consist of work tools or common objects of small and medium-sized dimensions.

As is well known, warehouses have access zones, in which the operator removes the article from the respective drawer or places the article in the drawer for the purpose of storing it inside the warehouse. The drawers are moved automatically by means of a logical control unit, which, based on the article selected by the operator, brings the respective drawer containing that article into the access zone.

In particular, each drawer is automatically moved into the access zone by means of a sliding carriage controlled accordingly by the control unit.

The carriage slides preferably vertically, passing along stacks of trays arranged in columns, and via suitable engagement means draws a given drawer into the access zone.

In this manner, once the drawer is positioned in the access zone, the operator can access the inside of the drawer itself, retrieval or placing the article.

The known automatic warehouses can be of two types, depending on the arrangement of the access zone: with an internal bay or an external bay.

In particular, in warehouses with an internal bay, the access zone is defined by an opening formed in the weight-bearing structure of the warehouse, in which the selected drawer is positioned. In this type of warehouse warehouse, the drawer always remains inside the footprint of the warehouse and the operator accesses the inside of the opening.

In warehouses with an external bay, the access zone is defined outside the warehouse, since the drawer is moved by the carriage outside an opening formed in the weight-bearing structure of the warehouse. In this solution the carriage can be provided with an extendable support, which causes the selected drawer to come out of the aforesaid opening. In warehouses with an external bay, the drawer is made to project outside the footprint of the warehouse to allow the operator facilitated access to the drawer.

In both types of warehouses, the drawer is generally provided with a retrieval/storage system that allows the operator correct access to the desired article.

This system is made up of a series of cover flaps positioned on an upper surface of the drawer, each of which is suitable for enabling access to a respective housing space provided in the drawer.

The flaps can be opened automatically by the logic control unit to allow the operator to remove or position the article correctly.

The number and size of the flaps will vary depending on the internal spaces of the drawer and hence on the articles contained. However, in order to standardize the dimensions of the spaces and of the respective cover flaps, use is generally made of drawers having flaps of identical dimensions and the same number of spaces for containing articles.

For this reason, retrieval/storage systems have a major drawback due precisely to the need to standardize the spaces and the respective flaps, with the consequent difficulty of adapting the dimensions of containment of the articles that must be stored in the warehouse.

To remedy this drawback, the single retrieval/storage systems of each drawer are individually designed and, consequently, the containment spaces inside the drawers are likewise constructed ad hoc.

In this manner, for every type and size of article that must be contained in the drawer, an appropriate flip-up system is constructed and designed for the respective space in the drawer.

However, this solution proves to be very costly and complicated, both in terms of construction and the time needed to design the individual drawers.

According to a further known technique, the drawers can also be always open to allow the operator, once in the access zone, to retrieve the article desired or position it freely inside the volume defined by the drawer.

This solution, though very simple and economical given the absence of cover flaps, results, however, in the possibility of mistakenly retrieval a wrong article, or the possibility of positioning the article incorrectly in the drawer.

SUMMARY OF THE INVENTION

According to the present invention, various limits and drawbacks of the prior art are overcome by means of a retrieval/storage apparatus for automatic warehouses comprising the features expressed in claim 1 and/or in one or more of the subsequent claims.

Additional features and advantages of the present invention will be more apparent from the detailed description of a preferred, but non exclusive, embodiment of a retrieval/storage apparatus.

BRIEF DESCRIPTION OF THE DRAWINGS

Said description will be set forth hereunder with reference to the appended drawings, provided solely for illustrative and thus non-limiting purposes, in which:

FIGS. 10 to 18 show schematic views of the possible ways of opening the automatic warehouse warehouse achieved by the retrieval/storage apparatus.

DETAILED DESCRIPTION OF PREFERRED EMBODIMENTS OF THE INVENTION

Figure 1:
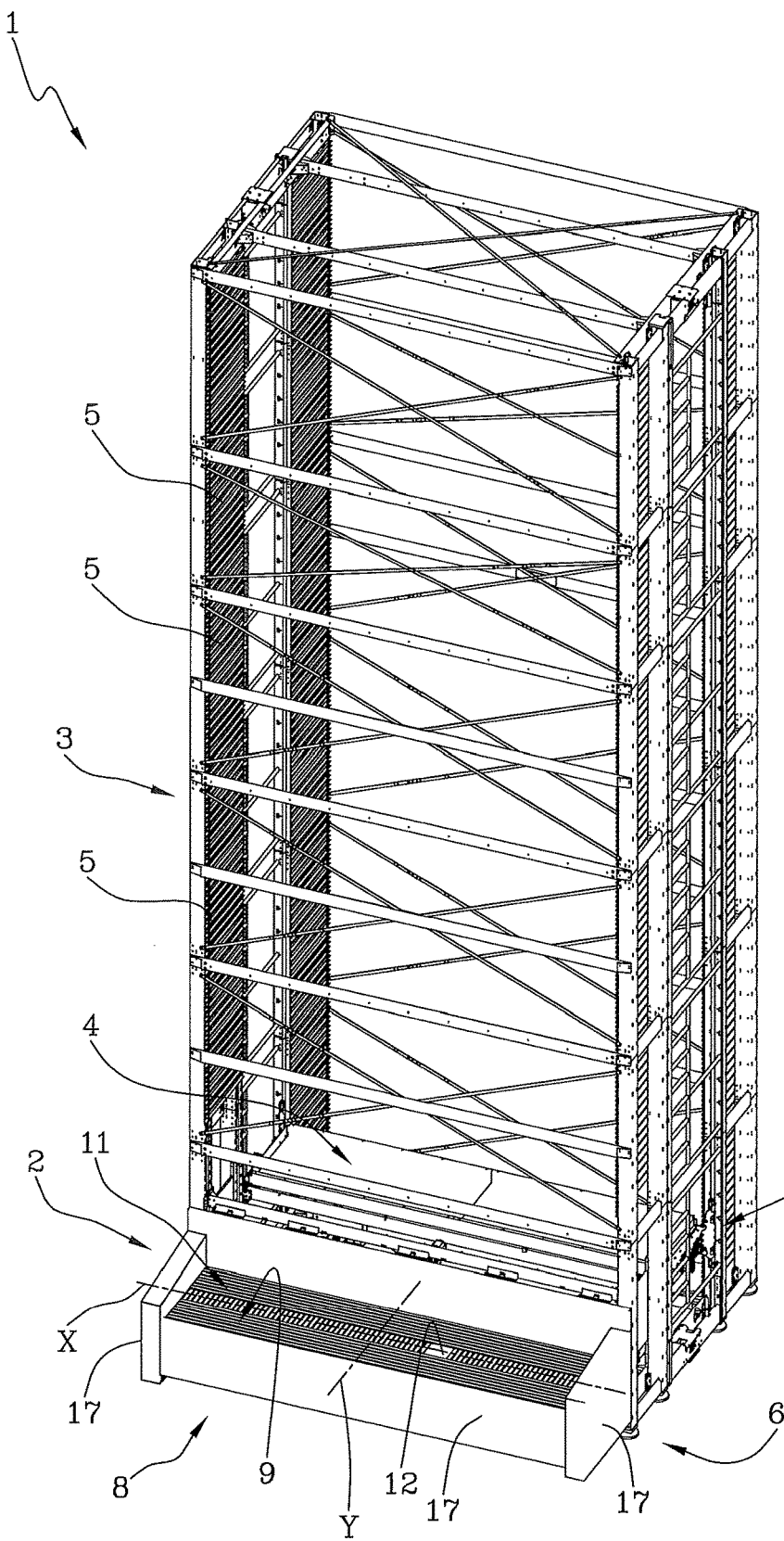
FIG. 1 shows a perspective view of an automatic warehouse warehouse, of the "external bay" type, provided with a retrieval/storage apparatus according to the present invention.
Figure 2:
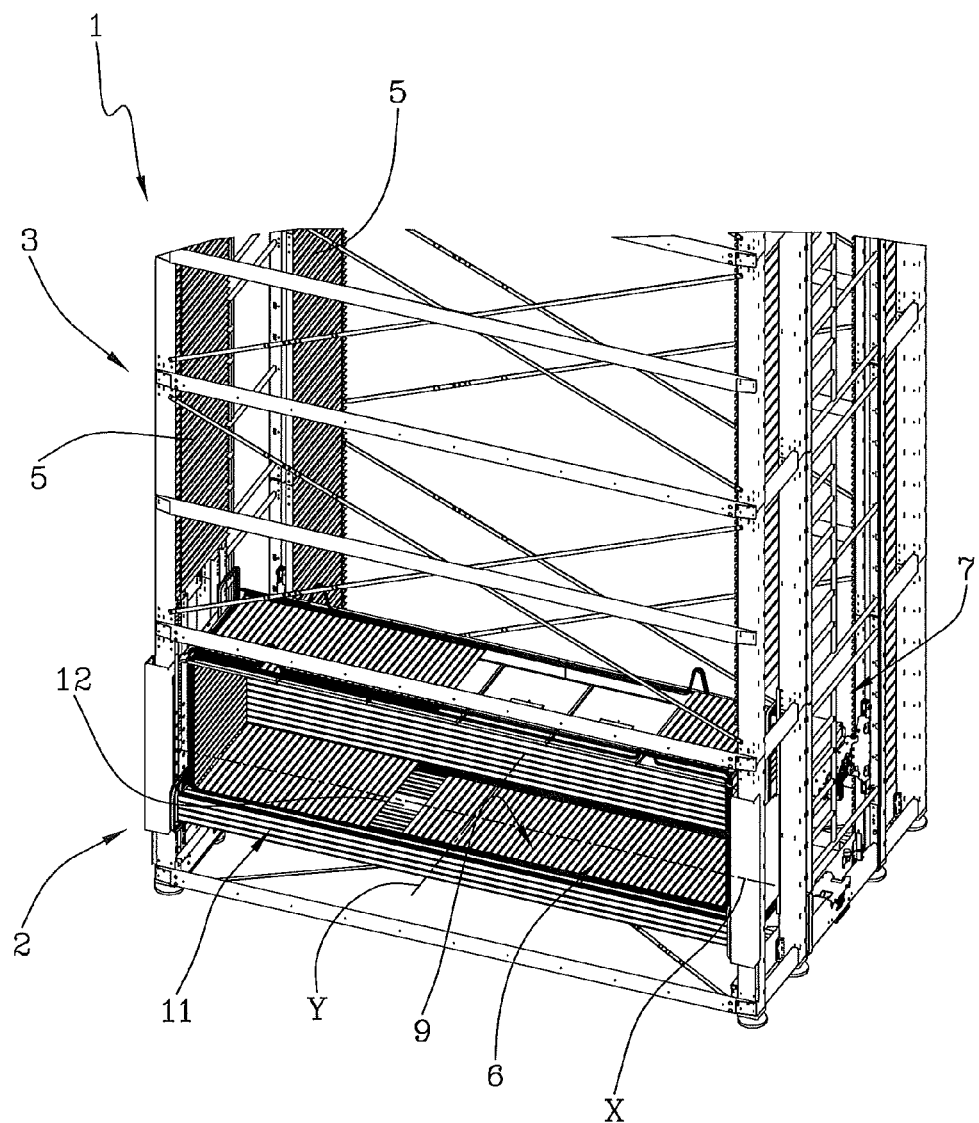
FIG. 2 shows a partial perspective view of an automatic warehouse warehouse, of the "internal bay" type, provided with a retrieval/storage apparatus according to the present invention.

With reference to FIGS. 1 and 2, 1 indicates overall an automatic warehouse warehouse, provided with a respective retrieval/storage apparatus 2.

Figure 3:
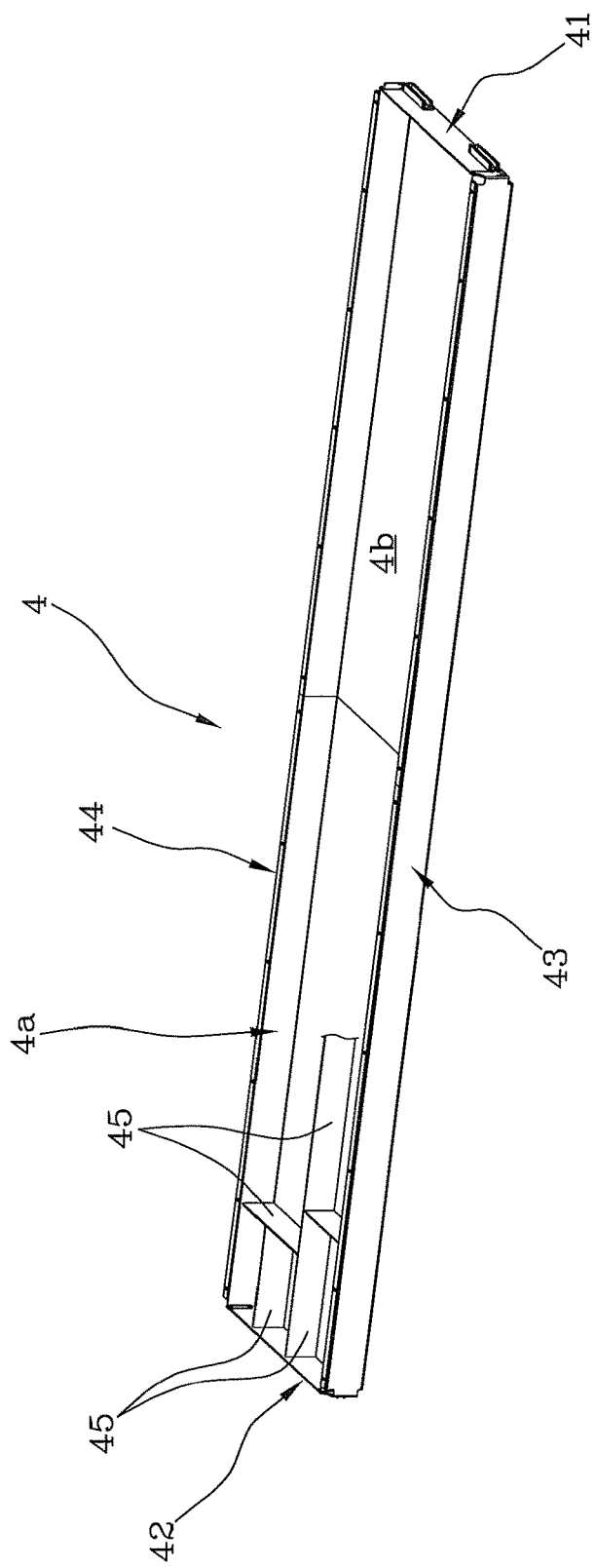
FIG. 3 shows a perspective view of a drawer for containing articles, which is used in the warehouse of FIGS. 1 and 2.

With particular reference to FIG. 1, the warehouse 1 of the present invention is preferably of the type endowed with a shelf-type support structure 3 for accommodating respective drawers 4 (better illustrated in FIG. 3).

The structure 3 preferably has a parallelepiped shape and defines a series of housings 5 positioned one above the other along one or more vertical columns. The housings 5 are designed to contain, in a storage configuration, the respective drawers 4, which are in this manner stacked. In the appended figures, the housings 5 are illustrated empty (in the absence of the drawers 4) in order to better view the structure of the entire warehouse 1.

An access zone 6 extending at the base of the support structure 3 adapted to allow the retrieval and/or storage of one or more articles (not illustrated, as they are not part of the present invention) contained in the drawers 4. Advantageously, the warehouse warehouse 1 is endowed with respective automatic, suitably motorized means 7 for handling the drawers 4, and for moving each drawer 4 between an idle position in which it is housed in the housing seat 5 and a position of access wherein it is positioned in the access zone 6.

The handling means 7, which are not described and illustrated in detail, as they are of a known type, are controlled by a programmable logic control unit that can be operated by a user.

Preferably, the means 7 consist of a carriage that moves along a path formed in the structure 3 so as to move each drawer 4 between the respective idle and access position.

In this manner, when it is required to retrieve/store a given article/object, the means 7 retrieve the corresponding drawer 4 to bring it into the access zone 6.

With reference to FIG. 3, there is illustrated a drawer 4 from which an article is retrieved or by means of which the article is stored in the warehouse warehouse 1.

The drawer 4 preferably has a tray-like conformation, with a substantially rectangular periphery and in which there is defined an opening 4a for accessing a containment volume 4b.

It should be noted that the access opening 4a extends along the whole drawer 4 in order to maintain open access to the volume 4b.

The articles (not illustrated) are accommodated inside the volume 4b, preferably according to predefined positions based on the size and number of the articles themselves.

Said drawer has a containment volume 4b, preferably parallelepiped shaped, open at the top through the access opening 4a.

Said drawer 4, having, in a plan view, a preferably quadrangular perimeter, is defined by a right side 41, a left side 42, a front side 43 and a back side 44.

Front side 43 means the side of the drawer 4 which, when the latter is placed inside the bay (external or internal), is farther from the handling means 7, i.e. closer to the operator positioned in front of the bay (external or internal), whereas back side 44 means the side of the drawer 4 which, when the latter is placed inside the bay (external or internal), is opposite the previous one and thus closer to the handling means 7, i.e. farther from the operator positioned in front of the bay (external or internal).

As can be seen in FIG. 3 the drawer 4 can comprise predefined partitions 45 serving to define, inside the drawer 4, a division into compartments of varying width depending on the articles contained.

In other words, the drawer 4 can have the volume 4b completely open, or else divided into spaces of a size determined by the manufacturer or spaces of a size determined by the user, by applying the partitions 45 inside the drawer 4.

As mentioned above, the warehouse warehouse 1 further comprises a retrieval/storage apparatus 2 located in the aforesaid access zone 6.

In particular, the apparatus 2 can be used irrespective of the type of warehouse 1 and with any configuration of the access zone 6.

For example, as is illustrated in the appended figures, the warehouse in FIGS. 1 and 4 to 6 is of the external bay type, whereas the warehouse illustrated in FIG. 2 and FIGS. 7 to 9 is of the internal bay type.

In greater detail, the external bay warehouse in FIG. 1 has an access zone 6 in a portion that is external to the structure 3, outside the footprint defined by the structure 3 itself. In the internal bay warehouse 1 in FIG. 2, the access zone 6 is defined in a portion located inside the structure 3 and thus inside the overall footprint of the warehouse warehouse 1.

Advantageously, the retrieval/storage apparatus 2 has a support frame 8 having a retrieval/storage level 9 for at least one article which must be retrieved from the warehouse 1 or stored in the warehouse 1.

In particular, the support frame 8, which will be better described further below in the present illustration, defines a housing space 10 for a drawer 4. The housing space 10 is in communication with the path of the handling means 7 to enable the drawer 4 to be housed in the space 10 or be moved away from the space 10.

The surface 9 extends above the space 10 and lies in a horizontal plane at a suitable height so as to be accessible by an operator.

Said retrieval/storage level 9 has, in a plan view, a preferably quadrangular perimeter defined by at least a first edge 9a, a second edge 9b, a third edge 9c and a fourth edge 9d.

Access means 11 extend over the surface 9 and are operatively active on the surface 9 itself so as to open/close at least one opening 12 through which it is possible to access the inside of the housing space 10.

Said at least one opening 12 has a closed contour defined by at least a first side 12a, a second side 12b, a third side 12c and a fourth side 12d.

As specified above, the drawer 4 is housed in the space 10 to enable retrieval/storage of the article.

Advantageously, the access means 11 define the opening 12 according to the positioning of the article to be retrieved, which, as specified above is in a predefined area of the drawer 4.

In other words, the means 11 determine an opening to allow the operator to access the drawer 4 and at the same time they close off said opening 12 so as to determine a completely closed surface 9.

The aforesaid access means 11 preferably consist of a first and a second wall 13, 14 both mobile along the retrieval/storage level 9 in reciprocal approaching/distancing.

There is also a third wall 15 mobile along the retrieval/storage level 9 in a direction transversal to the direction of movement of the first and second walls 13, 14.

Furthermore, the means 11 preferably also have a fourth wall 16 mobile along the retrieval/storage level 9 in reciprocal approaching/distancing with the third wall 15.

With particular reference to the appended figures, they represent a retrieval/storage apparatus 2, and associated warehouse warehouse 1, provided with four walls making up the access means 11.

Without going outside the scope of protection of the present invention, it is noted that the correct functioning of the apparatus 2, as of the warehouse warehouse 1, can also take place with three walls.

A preferred configuration will be illustrated below in the present description, making reference to the one constructed with four walls 13,14,15,16, and an alternative configuration, making reference to the one constructed with at least three walls 13,14,15.

Making reference, therefore, to the alternative configuration, the aforementioned opening 12 is defined by the cooperation of the first, second and third walls 13, 14, 15.

More precisely, the first side 12a is defined by a terminal end of the first wall 13, and the second side 12b is defined by a terminal end of the second wall 14, whilst the third and the fourth sides 12c, 12d, are defined by the terminal ends of the third wall 15.

In other words, again considering the alternative configuration of the apparatus 2 and making reference to the drawer 4 and the access means 11, the first wall 13 is bent over the containment volume 4b, above the same, and has at least one portion extending away from the left side 42 of the drawer 4 to block off, at least partially, the access opening 4a, the second wall 14 is bent over the containment volume 4b, above the same, and has at least one portion extending away from the right side 41 of the drawer 4 to block off, at least partially the access opening 4a, the third wall 15 is bent over the containment volume 4b, enveloping the front side 43, and has both portions extending away from the front side 43 of the drawer 4 to block off, at least partially the access opening 4a.

Figure 7:
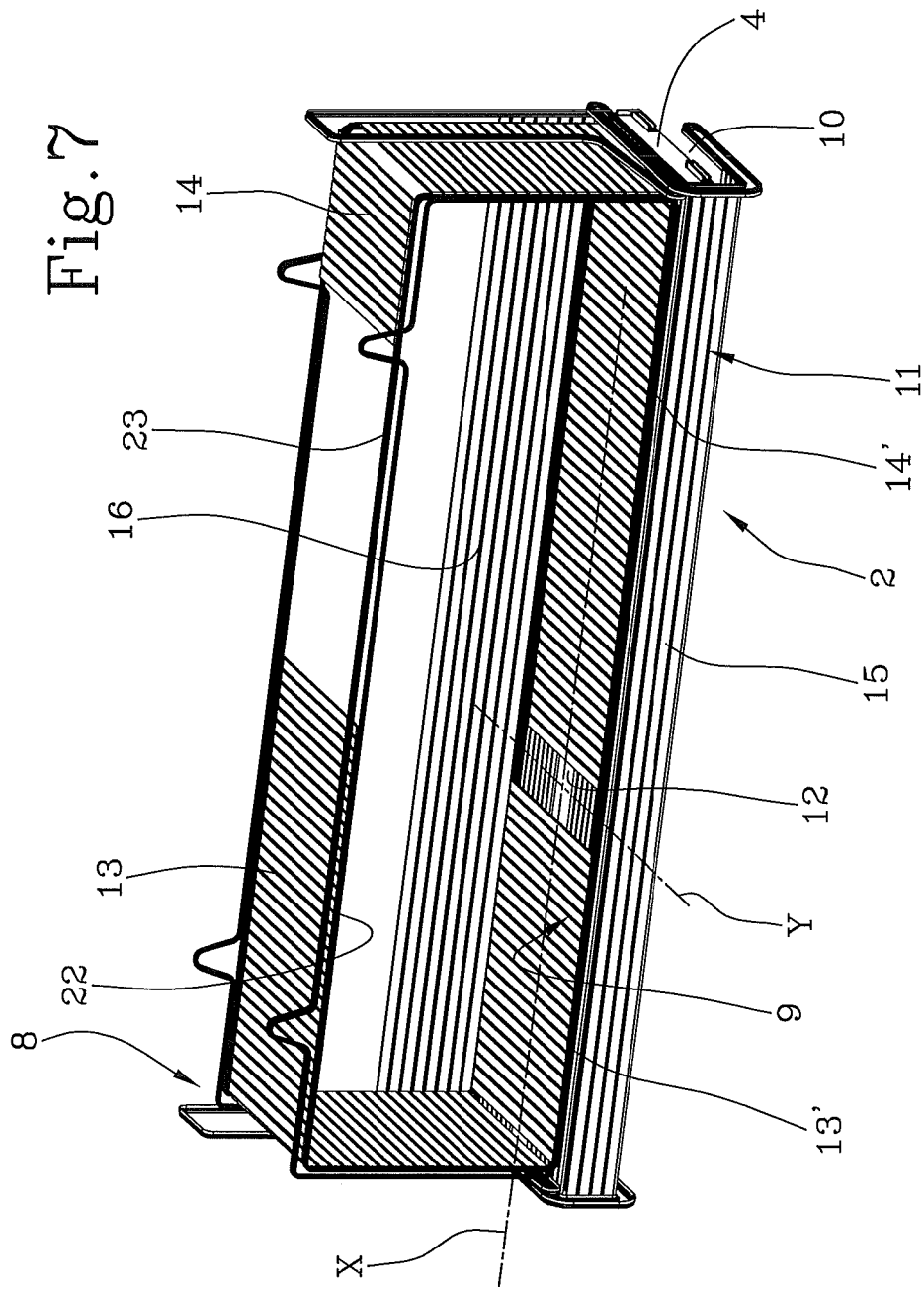
FIGS. 7 to 9 show perspective views of the apparatus in accordance with FIG. 2, respectively with some parts removed to better illustrate others.
Figure 9:
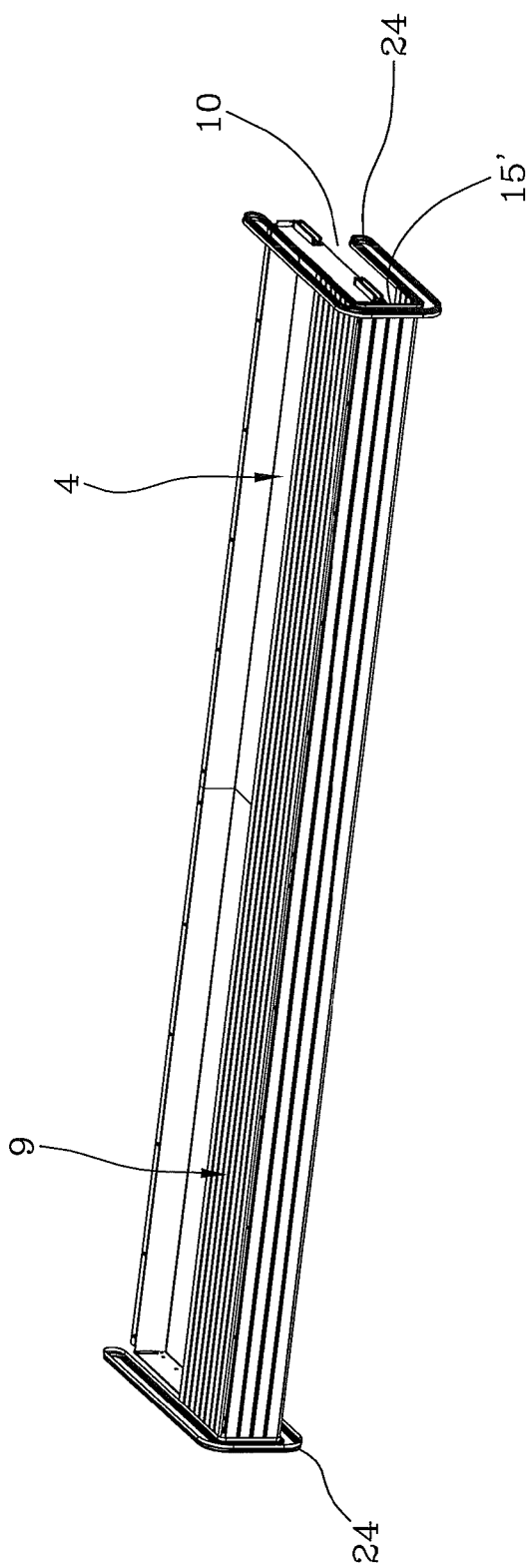

In the alternative configuration described above, the positioning of the first and second walls 13, 14 can be seen in FIG. 7, whilst the positioning of the third wall can be seen in FIG. 9.

As can be seen in the aforesaid figure the first wall 13 is bent over like a C above the containment volume 4b, with the bent over portion extending in proximity to the left side 42, the second wall is bent over like a C above the containment volume 4b, in opposition to the previous one, with the bent over portion in proximity to the right side 41, and the third wall 15 is bent over like a C so as to envelop the containment volume 4b, that is, with the portions situated above and below the containment volume 4b, and the bent over portion in proximity to the front side 43.

Making reference to the preferred configuration, the aforementioned opening 12 is defined by the cooperation of the first, second, third and fourth walls 13, 14, 15, 16.

More precisely, the first side 12a is defined by a terminal end of the first wall 13, the second side 12b is defined by a terminal end of the second wall 14, the third side 12c is defined by a terminal end of the third wall 15 and the fourth side 12d is defined by a terminal end of the fourth wall 16.

In other words, again considering the preferred configuration of the apparatus 2 and making reference to the drawer 4 and the access means 11, the first wall 13 is bent over the containment volume 4b, above the same, and has at least one portion extending away from the left side 42 of the drawer 4 to block off, at least partially, the access opening 4a, the second wall 14 is bent over the containment volume 4b, above the same, and has at least one portion extending away from the right side 41 of the drawer 4 to block off, at least partially, the access opening 4a, the third wall 15 is bent over the containment volume 4b, enveloping the front side 43, and has at least one portion extending away from the front side 43 of the drawer 4 to block off, at least partially, the access opening 4a, and the fourth wall 16 is bent over the containment volume 4b, above the same, and has at least one portion extending away from the back side 44 of the drawer 4 to block off, at least partially, the access opening 4a.

In the preferred configuration described above, the positioning of the first, second, third and fourth walls 13,14,15, 16 can be seen in FIG. 7.

As can be seen in the aforesaid figure, the first wall 13 is bent over like a C above the containment volume 4b, with bent over portion extending in proximity to the left side 42, the second wall is bent over like a C above the containment volume 4b, in opposition to the previous one, with the bent over portion extending in proximity to the right side 41, and the third wall 15 is bent over like a C to envelop the containment volume 4b, that is, with the portions situated above and below the containment volume 4b, and the bent over portion extending in proximity to the front side 43 and the fourth wall 16 is bent over like an L above the containment volume 4b, with the bent over portion extending in proximity to the back side 44.

The conformation of the fourth wall 16 is such as to protect the operator by inhibiting access to the handling means 7.

It should be noted that the walls 13, 14, 15 and 16 are mobile along the retrieval/storage level 9, in a configuration of reciprocal approaching/distancing so as to define the aforementioned opening 12 or completely block off the area defined by the surface 9.

In particular, the first and the second walls 13, 14s are slidable along the retrieval/storage level of 9 in a longitudinal direction of extension X of the frame 8. The third and fourth walls 15, 16 are in contrast slidable along the retrieval/storage level 9 in a transversal direction of extension Y.

As it is illustrated in FIGS. 1, 2, 4 and 8, the longitudinal and transversal directions of extension X, Y are perpendicular to each other.

It should further be noted that the walls 13, 14, 15 and 16 extend in respective superimposed lying surfaces, parallel to each other and parallel to the retrieval/storage level 9.

In this manner, the walls can at least partially overlap so as to completely close off the surface 9 in the condition of non-access to drawer 4.

Making reference now to FIGS. 10-18, they describe several embodiments of the at least one opening 12 implemented, through the access means 11, by both the alternative configuration and in the preferred configuration of the apparatus 2.

FIG. 10 illustrates a configuration of maximum opening of the retrieval/storage level 9 and complete superimposition of the at least one window 12 over the surface 9.

In this configuration, the area subtended by the least one opening 12 is equal to the area subtended by the surface 9.

This configuration, used for example for operations of filling and/or completely emptying the drawer 4 or for operations of inspecting the drawer 4, is achieved through the superimposition, or superimposed lying, of the first, second, third and fourth sides 12a-12d, of the opening 12 on the respective first, second, third, and fourth edges 9a-9d of the surface. In this configuration, the first, second and third walls 13,14,15 (or first, second, third and fourth walls 13,14,15,16) are completely open, i.e. not situated above the surface 9.

FIG. 11 illustrates a first configuration of partial opening of the retrieval/storage level 9 and of partial superimposition of the at least one window 12 over the surface 9.

In this configuration, the area subtended by the at least one opening 12 is smaller than the one subtended by the surface 9.

This configuration, used for operations of retrieval and/or storage inside the drawer 4 and analogous and opposite to the one represented in FIG. 12, is achieved through the superimposition, or superimposed lying, of at least three sides of the opening 12 on the respective and contiguous edges of the surface 9.

It shall be noted that for this and the subsequent examples, the condition of coincidence, or complete superimposition, between one side of the opening 12 and a respective edge of the surface 9, as for example in FIG. 11 between the first side 12a and the first edge 9a, can occur either by superimposition of the terminal portion of the wall 13-16 on the contiguous edge or by distancing of the terminal portion of the wall 13-16 from the contiguous edge of the retrieval and storage surface.

In the example illustrated in FIG. 11, the first side 12a coincides with the first edge 9a, the second side 12b extends parallel to and is not superimposed on the corresponding second edge 9b, the third side 12c lies, without coinciding, on the third edge 9c and the fourth side 12d lies, without coinciding, on the fourth edge 9d.

In the example illustrated in FIG. 13 the first side 12a lies, without coinciding, on the first edge 9a, just as the second side 12b lies, without coinciding, on the respective second edge 9b, the third side 12c extends parallel and is not superimposed on the corresponding third edge 9c and the fourth side 12d coincides with the fourth edge 9d.

FIG. 14 illustrates another first configuration of partial opening of the retrieval/storage surface 9 and of partial superimposition of the at least one window 12 over the surface 9.

In this configuration as well, the area subtended by the at least one opening 12 is smaller than the one subtended by the surface 9.

This configuration, again used for operations of retrieval and/or storage inside the drawer 4, similar to the ones represented in FIGS. 14-15, is achieved through the superimposition, or superimposed lying, of at least two sides of the opening 12 on respective contiguous edges of the surface 9.

In the illustrated example, the first side 12a lies, without coinciding, on the first edge 9a and the third side 12c lies, without coinciding, on the third edge 9c.

In brief, making reference to the example illustrated in FIG. 16, only the third side 12c lies, without coinciding, on third edge 9c.

FIG. 18 illustrates a second intermediate configuration of partial opening of the retrieval/storage surface 9 and of non-superimposition, or non-intersection, of the at least one window 12 with the surface 9.

In this configuration as well, the area subtended by the at least one opening 12 is smaller than the one subtended by the surface 9.

This configuration, again used for operations of retrieval and/or storage inside the drawer 4, is achieved through the non-superimposition, or non-superimposed lying, of all sides of the opening 12 on the respective edges of the surface 9.

In a first variant, not illustrated in the appended figures, each wall 13,14,15,16 can be of the shutter type driven by a respective motor so as to form an open-loop system, that is, one in which each wall is not closed in a loop.

In a second variant, not illustrated in the appended figures, each wall 13,14,15,16 can be of the shutter type or fabric type drawn by at least one chain, in turn conveyed on suitable motorized guides, so as to form an open-loop system.

In a third preferred variant, illustrated in the appended figures, each wall 13,14,15,16 can be of the shutter type, or, alternatively, fabric type, drawn by a system of belts, or, alternatively, a chain, so as to form a closed-loop system, that is, one in which each wall, or at least the respective guide belt system, is closed in a loop.

The present description will continue below with an illustration of the access means 11 in the third preferred variant briefly introduced above. Preferably, each wall 13, 14, 15 and 16 consists of a shutter slidable along a respective path 13', 14', 15', 16' which extends according to a substantially arcuate configuration around the housing space 10 of the drawer 4.

Each wall 13, 14, 15 and 16 is moved by means of respective motors of a known type, preferably provided with drive belts to convey the walls along the respective paths.

Advantageously, the walls are made to slide along the corresponding path between a position of maximum dimensions in which they block off the entire area defined by the retrieval/storage surface 9 and a position of minimum dimensions in which they are positioned over the retrieval/storage surface 9.

In accordance with the embodiment illustrated in FIGS. 1 and 4-6 and referring to an external bay warehouse warehouse, the frame 8 has a box-shaped structure, having a parallelepiped shape with a rectangular base.

In this case the retrieval/storage surface 9 is defined on an upper outer surface of the box-shaped structure of the frame 8.

Figure 4:
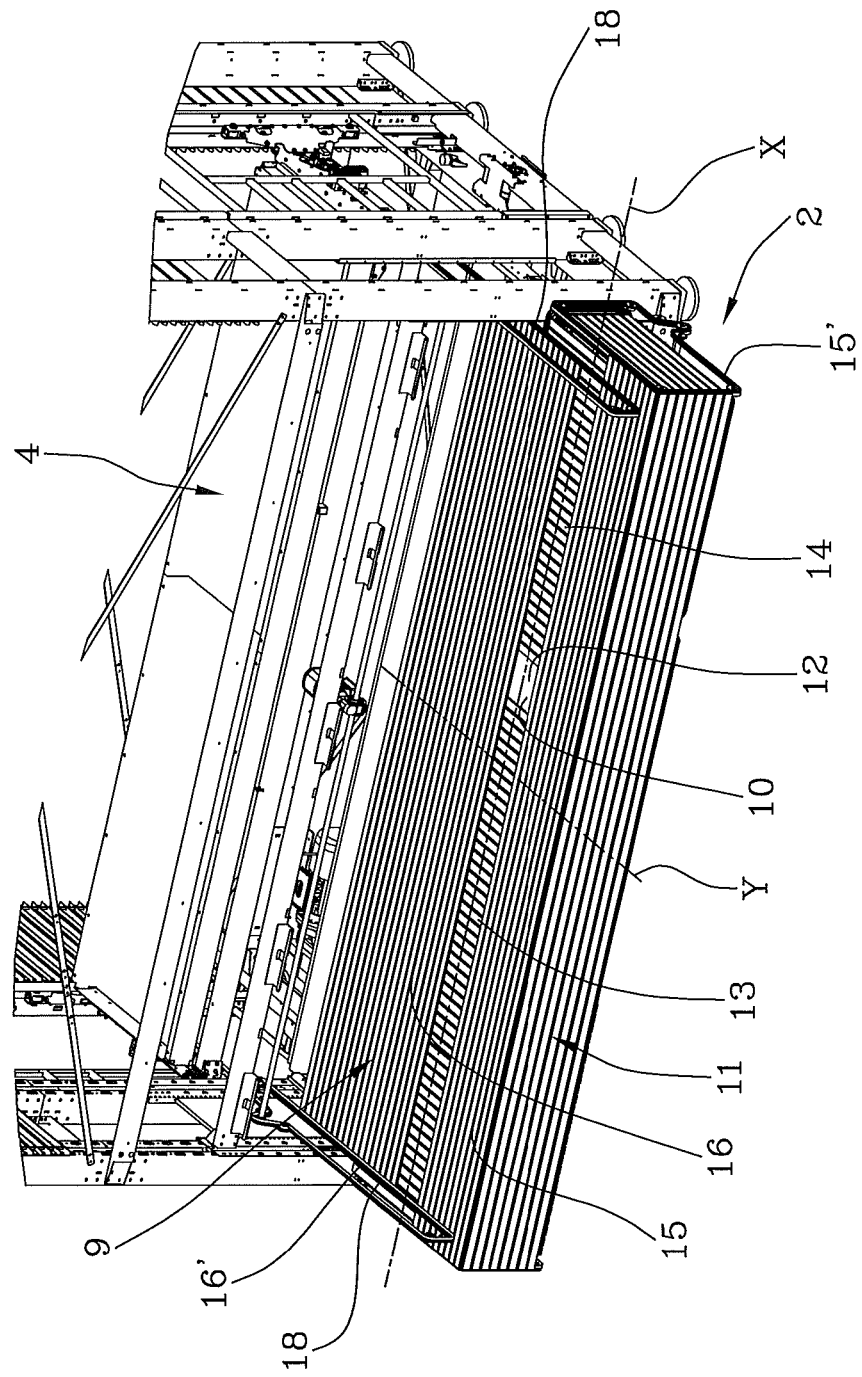
FIGS. 4 to 6 show perspective views of the apparatus in accordance with FIG. 1, respectively with some parts removed to better illustrate others.
Figure 5:
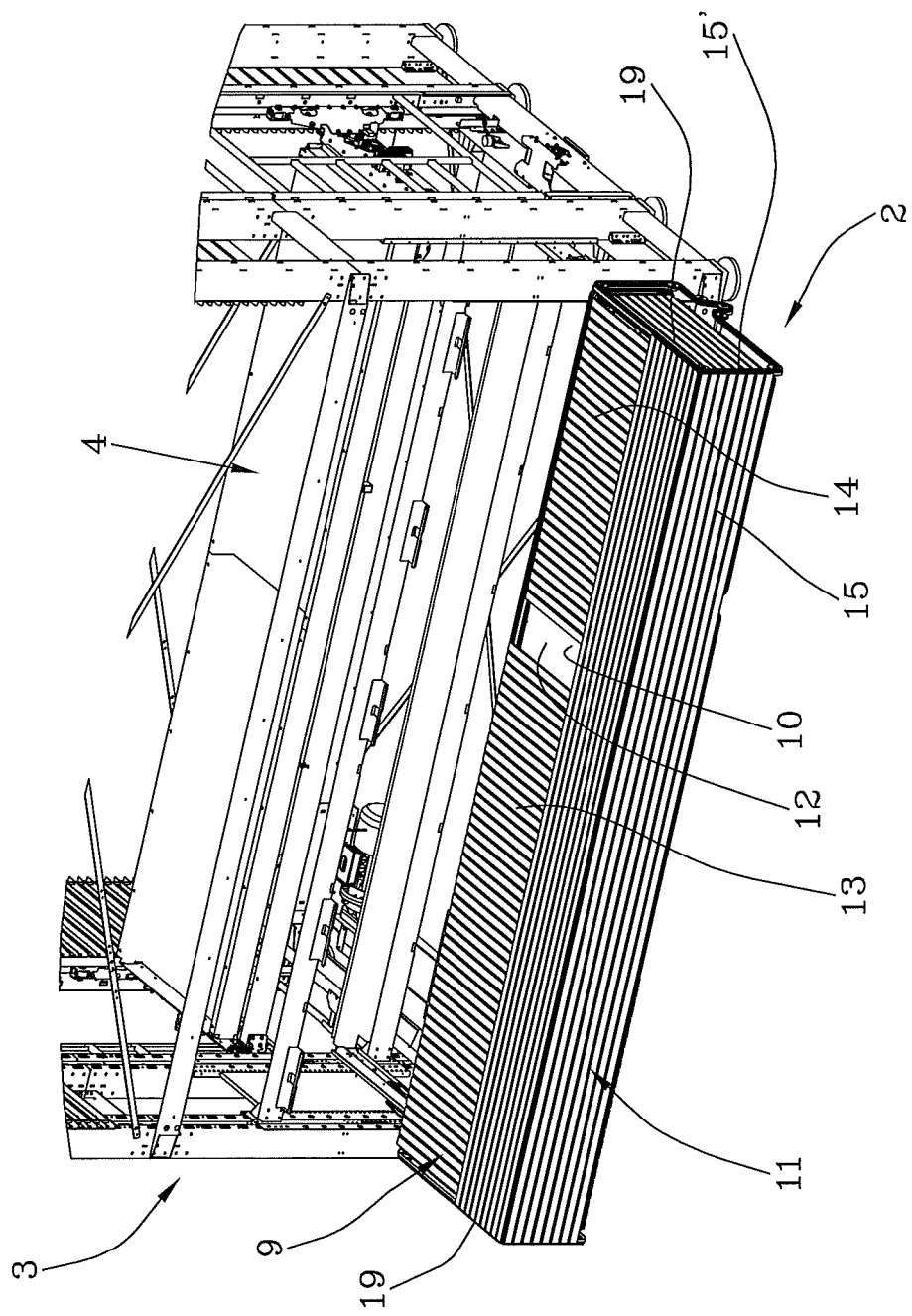
Figure 6:
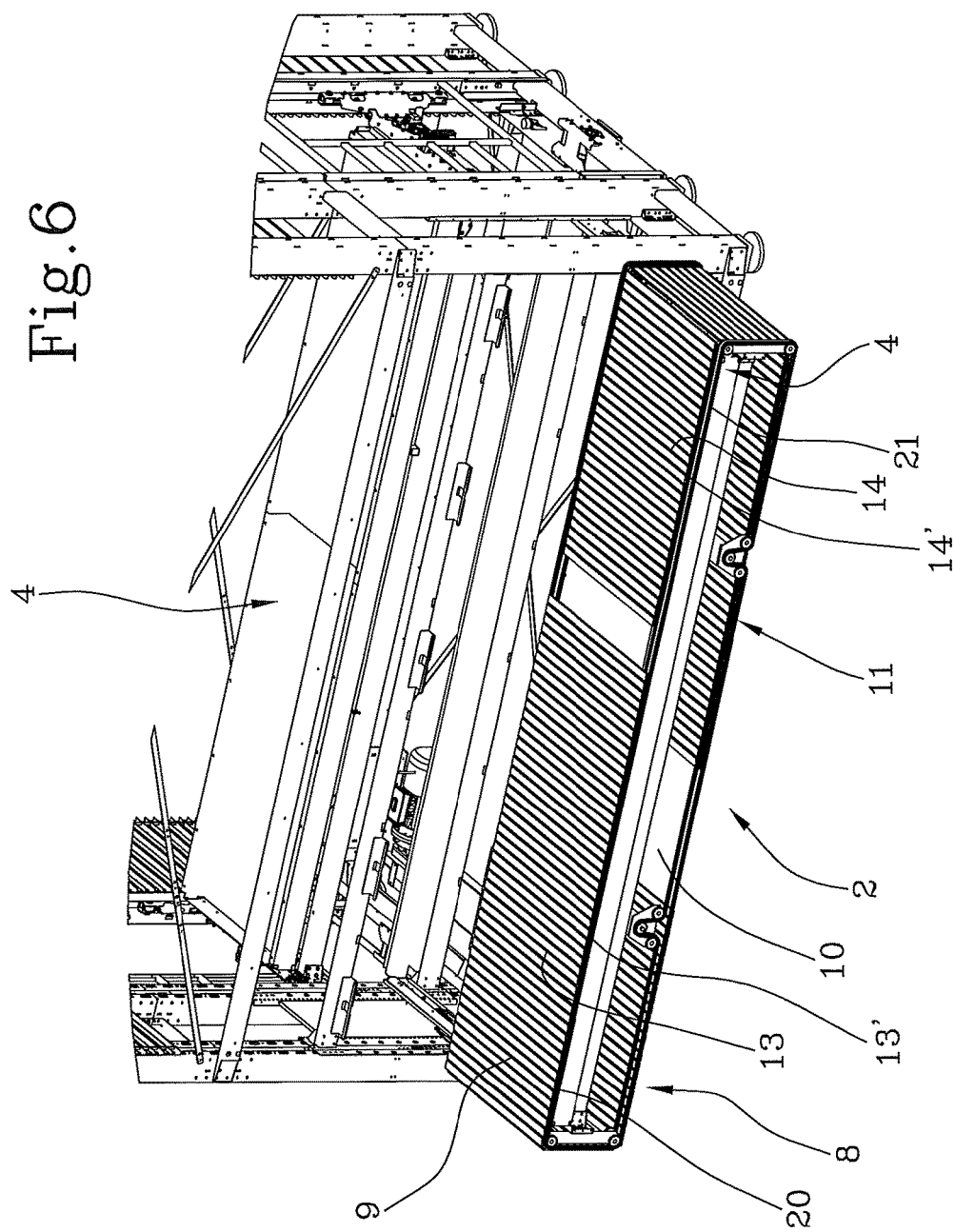

In FIGS. 4 to 6, the apparatus 2 is illustrated in detail with some parts removed to better illustrate the slidable walls. In particular, in FIG. 4 the covering walls 17 that define the exposed exterior of the box-shaped structure of the frame 8 have been removed.

In this figure one notes that the third and fourth walls 15, 16 are slidable above the first and second walls 13, 14.

In particular, the fourth wall 16 slides along a path 16' defined by respective sliding guides 18 arranged above the retrieval and storage surface 9. The sliding guides 18 form a closed loop and have a portion lying over the surface 9 and parallel to a transversal side of the box-shaped structure of the frame 8.

The third wall 15 extends along a "C-shaped" path 15' that extends around a lateral face of the box-shaped extension of the frame 8. As is illustrated in FIG. 5, in which the fourth wall 16 has been removed, the third wall 15 slides along guides 19 that likewise form a closed loop and have at least one portion lying along the surface 9.

In this manner, the third and fourth walls 15, 16 are slidable according to a motion of coming and going reciprocally closer and farther apart to determine the opening 12.

In FIG. 6, the third and fourth walls 15, 16 have been removed to better illustrate the first and second walls 13, 14.

In particular, it should be noted that the first and second walls 13, 14 are slidable around the frame 8 and along respective substantially semicircular paths 13', 14', facing and opposite each other. Each path 13', 14' is determined by respective guides 20, 21 extending circumferentially around the peripheral longitudinal extension of the box-shaped structure of the frame 8.

In this manner, the first and second walls 13, 14 are slidable according to a motion of coming and going reciprocally closer and farther apart to determine the opening 12.

It should be noted that the box-shaped structure of the frame 8 comprises an opening (not visible in the appended figures) for accessing the housing space 10 of the drawer 4, fashioned along a side adjacent to the retrieval/storage surface 9.

The opening is opposite the side where the third wall 15 extends and is equal in width to the peripheral longitudinal extension of the box-shaped structure of the frame 8.

This access opening enables the entry/exit of the drawer 4 into/from the space 10. Advantageously, the presence of the mobile walls 13, 14, 15 and 16 and respective sliding guides does not interfere with the movement of the drawer 4 through the aforementioned access opening.

In accordance with the embodiments of FIGS. 2 and 7-9, in which the warehouse warehouse 1 is of the internal bay type, the frame 8 has a substantially annular structure with a peripheral rectangular extension internally defining the retrieval/storage zone 6.

In this situation, it should be noted that the retrieval/storage surface 9 is provided at a lower internal surface of the aforementioned annular structure of the frame 8.

In the detail in FIG. 7, the first and second walls 13, 14 are illustrated in detail, both slidable around respective semicircular paths 13', 14', which are opposite and facing each other and defined by the peripheral longitudinal extension of the annular structure of the frame 8.

In particular, both the first and second walls slide according to a motion of coming and going reciprocally closer and farther apart along sliding guides 22, 23 that both have a portion passing through the surface 9.

In this case as well, each guide 22, 23 forms a closed loop and each corresponding wall is suitably motorized with a motor that is not illustrated and described, as it is of a known type.

The third and fourth wall 15, 16 are slidable beneath the first and second wall 13, 14 along the lower inner surface of the aforementioned annular structure of the frame 8.

Figure 8:
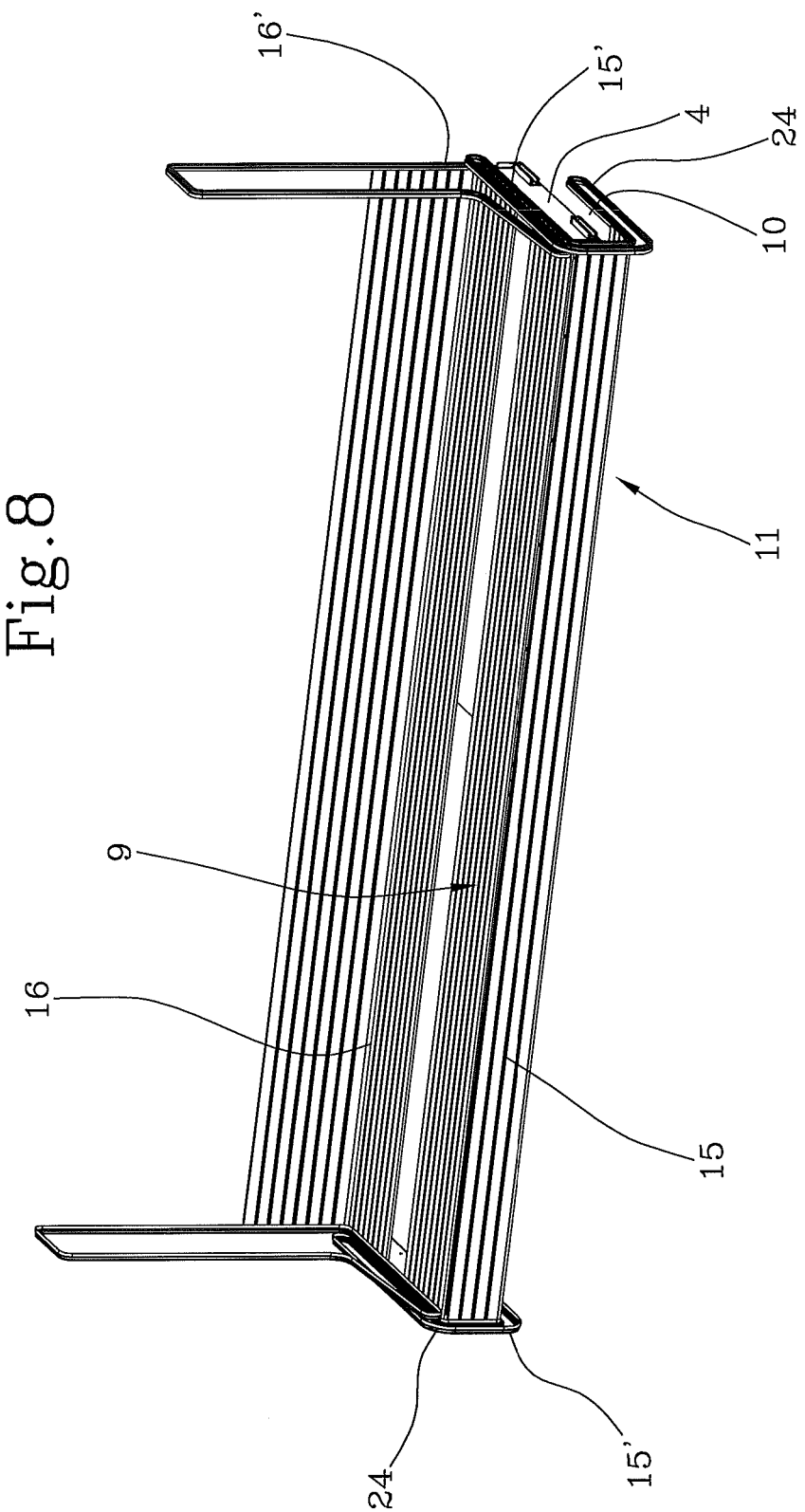

With reference to FIG. 8, in which the first and second walls 13, 14 have been removed, it should be noted that the third wall 15 extends along a C-shaped path 15' entirely situated beneath the frame 8.

The path 15' is determined by sliding guides 24 forming a closed loop, each positioned on a transversal edge of the frame 8.

As better illustrated in FIG. 9, it should be noted that the path 15' of the third wall 15 extends at least partially around the containment space 10 of the drawer 4. In this manner, the space 10 has an access opening for the entry/exit of the drawer 4 into/from the space 10.

In this regard it should be pointed out that the fourth wall 16 extends along a semi-annular path 16' extending at least partially along a side of the frame 8, opposite an open side for accessing the retrieval and storage zone 6.

In other words, the fourth wall 16 slides along the surface 9 and in a side of the frame 8 adjacent to said surface 9.

The third and fourth walls 15, 16 are motor driven in a motion of coming and going reciprocally closer and farther apart.

Advantageously, the apparatus 2 enables precise access to the space 10 and thus inside the drawer 4.

In this manner, the operations of retrieval and storage of the articles take place in a precise manner, since the walls determines the opening 12 only in the area of the drawer the operator needs to access.

Potential errors of retrieval the wrong article or errors in positioning an article inside the drawer 4 are thus eliminated.

Moreover, the apparatus 2 is very versatile and adaptable to any type and size of article contained in the drawer 4.

This advantage is given by the automatic movement of the walls, which, by sliding on the surface 9 in reciprocal approaching/distancing determine the width and position of the opening 12. The correct access of the operator to the drawer 4 is thus determined by the logic control unit via reciprocal movements of the walls according to the size and position of the article.

The present apparatus, including the automatic warehouse warehouse equipped with at least one apparatus, has a high level of flexibility of application: it is a single device for all the drawers. In fact, with the adoption of drawers, a wide range of products of different sizes and shapes can be contained, with the possibility of arranging the products inside the drawer itself in any manner. Therefore, this enables a reduction in the costs of designing the apparatus, thanks to the format of the drawer used to contain the product, and in particular its internal layout.

The invention claimed is:

1. A retrieval/storage apparatus for warehouses, comprising:
a support frame (8) presenting a retrieval/storage surface (9) for at least one article which must be retrieved from a respective warehouse (1) or stored in said warehouse (1);
said frame (8) defining a housing space (10) for a drawer (4) of containment of said at least one article, said housing space (10) having an access opening along a side adjacent and perpendicular to said retrieval/storage surface (9), for the entry/exit of the drawer (4) into/from the space (10);
access means (11) operatively active on said retrieval/storage surface (9) to open/close at least one opening (12) through which it is possible to access said housing space (10), inside the drawer (4);
said access means (11) comprising a first wall and a second wall (13, 14) both mobile along the retrieval/storage surface (9) in a longitudinal direction of extension (X) of the support frame (8), and a third wall (15) mobile along the retrieval/storage surface (9) in a transversal direction of extension (Y) of the support frame;
wherein each wall (13,14,15) consists of a shutter slidable along a respective path (13',14',15') which extends according to a substantially arcuate configuration around the housing space (10) of the drawer (4), such as not to interfere with the access opening of the housing space (10).

2. The apparatus according to claim 1, characterised in that said at least one opening (12) presents a closed contour defined by at least a first side (12a), a second side (12b), a third side (12c) and a fourth side (12d).

3. The apparatus according to claim 2, characterised in that said first and second walls (13, 14) define respectively a first and second side (12a, 12b) and said third wall (15) defines a third and fourth side (12c, 12d) of the at least one opening (12).

4. The apparatus according to claim 2, wherein said retrieval/storage surface (9) presents a closed contour defined by at least a first edge (9a), a second edge (9b), a third edge (9c) and a fourth edge (9d), characterised in that said access means (11), when operatively active on said retrieval/storage surface (9) to open the at least one opening (12), define at least a configuration between:

a configuration of maximum opening and complete superimposition wherein the at least one opening (12) subtends an area equal to the area subtended by the retrieval/storage surface (9), said first wall (13) defining the first side (12*a*) superimposed on the first edge (9*a*), said second wall (14) defining the second side (12*b*) superimposed on the second edge (9*b*), said third wall (15) defining the third and fourth sides (12*c*, 12*d*) superimposed respectively on the third and fourth edges (9*c*, 9*d*);

a first configuration of intermediate opening and partial superimposition wherein the at least one opening (12) subtends an area smaller than the area subtended by the retrieval/storage surface (9), said first and second walls (13, 14) defining respectively the first and second sides (12*a*, 12*b*) of the opening (12), said third wall (15) defining the third and fourth sides (12*c*, 12*d*) of the opening (12), at least one side (12*a*, 12*b*, 12*c*, 12*d*) of the opening (12) being superimposed on a respective edge (9*a*, 9*b*, 9*c*, 9*d*) of the retrieval/storage surface (9);

a second configuration of intermediate opening and absence of superimposition wherein the at least one opening (12) subtends a smaller area than the area subtended by the retrieval/storage surface (9), said first and second walls (13, 14) defining respectively the first and second sides (12*a*, 12*b*) of the opening (12), said third wall (15) defining the third and fourth sides (12*c*, 12*d*) of the opening (12), all the sides (12*a*, 12*b*, 12*c*, 12*d*) of the opening (12) not being superimposed on the respective adjacent edges (9*a*, 9*b*, 9*c*, 9*d*) of the retrieval/storage surface (9).

5. The apparatus according to claim 2, wherein it further comprises a fourth wall (16) mobile along the retrieval/storage surface (9) in the transversal direction of extension (Y) of the support frame with said third wall (15), and characterised in that said first and second walls (13, 14) define respectively first and second sides (12*a*, 12*b*) of the opening (12) and said third and fourth walls (15, 16) define respectively third and fourth sides (12*c*, 12*d*) of the opening (12).

6. The apparatus according to claim 1, characterised in that said drawer (4), presenting a containment volume (4*b*) open at the top through the access opening (4*a*), is defined by at least a right side (41), a left side (42), a front side (43) and a back side (44).

7. The apparatus according to claim 6, characterised in that said access means (11) present, when operatively active on said retrieval/storage surface (9) to open the at least one opening (12), the first wall (13) bent over a containment volume (4*b*) extending away from the left side (42) to block at least partially the access opening (4*a*), the second wall (14) bent over the containment volume (4*b*) extending away from the right side (41) to block at least partially the access opening (4*a*), the third wall (15) bent over the containment volume (4*b*) enveloping the front side (43) and reciprocally extending away from the same to block at least partially the access opening (4*a*).

8. The apparatus according to claim 6, wherein it further comprises a fourth wall (16) mobile along the retrieval/storage surface (9) in the transversal direction of extension (Y) of the support frame with said third wall (15), and characterised in that said access means (11) present, when operatively active on said retrieval/storage surface (9) to open the at least one opening (12), the first wall (13) bent over the containment volume (4*b*) extending away from the left side (42) to block at least partially the access opening (4*a*), the second wall (14) bent over the containment volume (4*b*) extending away from the right side (41) to block at least partially the access opening (4*a*), the third wall (15) bent over the containment volume (4*b*) extending away from the front side (43) to block at least partially the access opening (4*a*), the fourth wall (16) bent over the containment volume (4*b*) extending upwards and away from the back side (44) to block at least partially the access opening (4*a*).

9. The apparatus according to claim 1, characterised in that said retrieval/storage surface (9) presents a closed contour defined by at least a first edge (9*a*), a second edge (9*b*), a third edge (9*c*) and a fourth edge (9*d*).

10. The apparatus according to claim 9, wherein it further comprises a fourth wall (16) mobile along the retrieval/storage surface (9) in the transversal direction of extension (Y) of the support frame with said third wall (15), and characterised in that said access means (11), when operatively active on said retrieval/storage surface (9) to open the at least one opening (12), define at least a configuration between:

a configuration of maximum opening and complete superimposition wherein the at least one opening (12) subtends an area equal to the area subtended by the retrieval/storage surface (9), said first wall (13) defining a first side (12*a*) superimposed on the first edge (9*a*), said second wall (14) defining the second side (12*b*) superimposed on the second edge (9*b*), said third wall (15) defining the third side (12*c*) superimposed on the third edge (9*c*), said fourth wall (16) defining the fourth side (13*d*) superimposed on the fourth edge (9*d*);

a first configuration of intermediate opening and partial superimposition wherein the at least one opening (12) subtends an area smaller than the area subtended by the retrieval/storage surface (9), said first and second walls (13, 14) defining respectively the first and second sides (12*a*, 12*b*) of the opening (12), said third and fourth walls (15, 16) defining respectively the third and fourth sides (12*c*, 12*d*) of the opening (12), at least one side (12*a*, 12*b*, 12*c*, 12*d*) of the opening (12) being superimposed on a respective edge (9*a*, 9*b*, 9*c*, 9*d*) of the retrieval/storage surface (9);

a second configuration of intermediate opening and absence of superimposition wherein the at least one opening (12) subtends a smaller area than the area subtended by the retrieval/storage surface (9), said first and second walls (13, 14) defining respectively the first and second sides (12*a*, 12*b*) of the opening (12), said third and fourth walls (15, 16) defining respectively the third and fourth sides (12*c*, 12*d*) of the opening (12), all the sides (12*a*, 12*b*, 12*c*, 12*d*) of the opening (12) not being superimposed on the respective adjacent edges (9*a*, 9*b*, 9*c*, 9*d*) of the retrieval/storage surface (9).

11. The apparatus according to claim 1, characterised in that it further comprises a fourth wall (16) mobile along the retrieval/storage surface (9) in the transversal direction of extension (Y) of the support frame with said third wall (15).

12. The apparatus according to claim 11, characterised in that the first and second walls (13, 14) are slidable along the retrieval/storage surface (9) in a longitudinal direction of development (X) of the frame (8), and that said third and fourth walls (15, 16) are slidable along the retrieval/storage surface (9) in a transversal direction of extension (Y) of the frame (8), said longitudinal (X) and transversal (Y) directions being perpendicular to each other.

13. The apparatus according to claim 11, wherein said frame (8) has a box-shaped structure, having a parallelepiped shape with a rectangular base; said retrieval/storage surface (9) being arranged at an outer and upper surface of said box-shaped structure, and characterised in that said fourth wall (16) is slidable above the first and second walls (13, 14) along a path (16') defined by respective slidable guides (18) arranged above the retrieval/storage surface (9).

14. The apparatus according to claim 11, wherein said third wall (15) is slidable beneath said first and second walls (13, 14) at an inner and lower surface of an annular structure of the frame (8), and along a substantially semicircular path (15') extending at least partially around the housing space (10) of the drawer (4), and characterised in that said fourth wall (16) is slidable beneath the first and second walls (13, 14) at the inner and lower surfaces of the annular structure of the frame (8) and along a substantially semi-annular path (16') defined by a peripheral transversal extension of the annular structure of the frame (8).

15. The apparatus according to claim 14, characterised in that said semi-annular path (16') of the fourth wall (16) extends at least partially along a side of the frame (8), opposite an open side to access a retrieval and storage zone (6).

16. The apparatus according to claim 1, characterised in that the first and second walls (13, 14) are slidable along the retrieval/storage surface (9) in a longitudinal direction of development (X) of the frame (8), and that said third wall (15) is slidable along the retrieval/storage surface (9) in a transversal direction of extension (Y) of the frame (8), said longitudinal (X) and transversal (Y) directions being perpendicular to each other.

17. The apparatus according to claim 1, wherein it further comprises a fourth wall (16) mobile along the retrieval/storage surface (9) in the transversal direction of extension (Y) of the support frame with said third wall (15), and characterised in that said walls (13, 14, 15, 16) extend on respective superimposed lying surfaces, parallel to each other and parallel to the retrieval/storage surface (9).

18. The apparatus according to claim 1, wherein it further comprises a fourth wall (16) mobile along the retrieval/storage surface (9) in the transversal direction of extension (Y) of the support frame with said third wall (15), and characterised in that each wall (13, 14, 15, 16) comprises a mobile shutter along a predefined path (13', 14', 15', 16') defined around said housing space (10) of the drawer (4).

19. The apparatus according to claim 18, characterised in that each wall (13, 14, 15, 16) comprises respective motorised means to slide the shutter along the corresponding path (13', 14', 15', 16') between a position of maximum dimensions wherein it blocks the entire area defined by the retrieval/storage surface (9) and a position of minimum dimensions wherein it is not housed at the retrieval/storage surface (9).

20. The apparatus according to claim 1, characterised in that said frame (8) has a box-shaped structure, having a parallelepiped shape with a rectangular base; said retrieval/storage surface (9) being arranged at an outer and upper surface of said box-shaped structure.

21. The apparatus according to claim 20, characterised in that said first and second walls (13, 14) are slidable around the frame (8) and along a substantially semicircular path (13', 14') defined by a peripheral longitudinal extension of said box-shaped structure of the frame (8).

22. The apparatus according to claim 21, characterised in that said third wall (15) is slidable above the first and second walls (13, 14), around the frame (8) and along a substantially semicircular path (15') defined by a peripheral transversal extension of said box-shaped structure of the frame (8).

23. The apparatus according to claim 1, characterised in that said frame (8) has an annular structure with a substantially rectangular peripheral shape, wherein a retrieval/storage zone (6) is defined within said annular structure; said retrieval/storage surface (9) being arranged at an inner and lower surface of said annular structure.

24. The apparatus according to claim 23, characterised in that said first and second walls (13, 14) are slidable around the frame and along a substantially semicircular path (13', 14') defined by a peripheral longitudinal extension of said annular structure of the frame (8).

25. The apparatus according to claim 24, characterised in that said third wall (15) is slidable beneath said first and second walls (13, 14) at said inner and lower surface of the annular structure of the frame (8), and along a substantially semicircular path (15') extending at least partially around the housing space (10) of the drawer (4).

26. Automatic warehouse comprising:
  a support structure (3) for a plurality of drawers (4) of containment of articles which must be retrieved/stored;
  at least one access zone (6) defined in said support structure (3) to allow retrieval from and/or storage in one or more drawers (4) of one or more articles;
  handling means (7) for the drawers (4), to move each drawer (4) between an idle position wherein they are stocked in respective housing spaces (5) of the structure (3) and a position of access wherein they are arranged in said at least one access zone (6) to allow retrieval/storage of one or more articles housed in the drawers (4);
characterised in that it also comprises at least one retrieval/storage apparatus (2) according to claim 1, arranged in said at least one access zone (6).

27. The warehouse according to claim 26, characterised in that said handling means (7) for the drawers (4) extend along a route formed in said structure (3) to move each drawer (4) between the respective idle and access positions; said housing space (10) of the frame (8) of said apparatus (2) being in communication with said path.

28. The warehouse according to claim 27, characterised in that said drawer (4) in the respective access position is housed in the space (10) of the frame (8) and that said drawer (4), when it is housed in the space (10) of the frame (8) presents at least one access opening (4a) to one or more articles contained in the drawer (4) itself, facing the retrieval/storage surface (9) of the apparatus (2).

* * * * *